United States Patent [19]

Caille

[11] Patent Number: 5,652,597
[45] Date of Patent: Jul. 29, 1997

[54] ELECTRONICALLY-SCANNED TWO-BEAM ANTENNA

[75] Inventor: Gérard Caille, Tournefeuille, France

[73] Assignee: Alcatel Espace, Nanterre Cedex, France

[21] Appl. No.: 291,713

[22] Filed: Aug. 16, 1994

[30] Foreign Application Priority Data

Aug. 23, 1993 [FR] France ................................. 93 10184

[51] Int. Cl.$^6$ .................................................. H01Q 19/00
[52] U.S. Cl. ...................... 343/756; 343/781 P; 343/840
[58] Field of Search ........................ 343/754, 755, 343/756, 781 P, 781 R, 840, 909, 912, 914; H01Q 19/00, 19/13

[56] References Cited

U.S. PATENT DOCUMENTS

| | | | |
|---|---|---|---|
| 4,364,052 | 12/1982 | Ohm | 343/781 P |
| 4,489,331 | 12/1984 | Salvat et al. | 343/756 |
| 4,625,214 | 11/1986 | Parekh | 343/781 P |
| 4,647,938 | 3/1987 | Roederer et al. | 343/840 |
| 4,665,405 | 5/1987 | Drabowitch et al. | 343/756 |
| 4,823,143 | 4/1989 | Bockrath | 343/781 P |
| 5,227,802 | 7/1993 | Pullman et al. | 342/352 |
| 5,444,449 | 8/1995 | Doskett et al. | 342/354 |
| 5,459,475 | 10/1995 | Shen et al. | 343/781 CA |

FOREIGN PATENT DOCUMENTS

| | | |
|---|---|---|
| 0466579A1 | 1/1992 | European Pat. Off. . |
| 0496329A1 | 7/1992 | European Pat. Off. . |
| 0534862A1 | 3/1993 | European Pat. Off. . |
| 2585514A1 | 1/1987 | France . |
| 0019303 | 1/1985 | Japan ................................. 343/756 |
| 2262387 | 5/1993 | United Kingdom . |

OTHER PUBLICATIONS

J. Richard et al, "Observation de la terre depuis l'espace a l'aide d'instruments hyperfrequences actifs", *L'onde Electrique*, vol. 72, No. 6, Nov. 1992, pp. 29–38.

Primary Examiner—Donald T. Hajec
Assistant Examiner—Tan Ho
Attorney, Agent, or Firm—Sughrue, Mion, Zinn, Macpeak & Seas

[57] ABSTRACT

An electronically-scanned two-beam antenna designed for being installed on board a moving platform, and in particular a satellite. The antenna of the invention comprises a single, complex reflector whose reflectivity is responsive to the polarization with which it is illuminated, and associated with two arrays of orthogonally-polarized sources that illuminate the complex reflector using an offset configuration. The complex reflector is made up of two reflectors placed one in front of the other in the beam propagation direction. The first reflector is transparent to a first linear polarization and reflective to an orthogonal polarization, while the second reflector is reflective at least for the first polarization. The two resulting beams thus propagate in different directions, both parallel to the trajectory of the platform. Electronic scanning is provided in a plane perpendicular to the orbit plane. The invention is applicable to stereoscopic radars for observing the earth from a satellite, and also to radiometry.

21 Claims, 7 Drawing Sheets

ELECTRONICALLY-SCANNED TWO-BEAM ANTENNA

FIELD OF THE INVENTION

The field of the invention is that of electronically-scanned active antennas, and more particularly antennas designed to be installed on board a moving platform. The antenna of the invention is advantageously used for space radar missions from an artificial satellite in earth orbit. It may also be applied to aircraft or other vehicles that move close to the surface of the earth or of any other celestial body (planet, asteroid, comet, interstellar cloud, . . . etc.).

BACKGROUND OF THE INVENTION

It is a known practice to give remote detection missions using microwave radar to satellites in low orbit. Unlike a geostationary satellite, a satellite in low orbit moves relative to a fixed point on the surface of the earth. This movement allows an observation satellite to overfly the earth in a direction that is determined by its orbit. Radar measurements performed at successive moments while the satellite is moving along its path enable a map of the measured parameters to be drawn up as a function of the position of the satellite or other vehicle being used as the radar platform.

A known use of space radar is to measure precipitation rates, or other atmospheric data. A radar wave transmitted at a well-defined polarization is subjected to depolarization as it travels, and also to "backscattering"; by measuring the percentage of reflected power detected by the radar, it is possible to deduce the precipitation rate in the region being probed by the radar. In order to draw up a map of such measurements with adequate three dimensional resolution, it is desirable for the transmitted beam to be very narrow, e.g. to have an annular divergence $\beta$ lying in the range about $0.18°$ to about $0.4°$, so as to probe a relatively precise location with a train of radar pulses. In addition, in order to be able to cover the entire globe in a reasonable length of time, e.g. compatible with the time scale of meteorological changes, it is desirable for the beam to be steerable over a relatively large transverse angle, of the order of $\pm 10°$ to $\pm 20°$ relative to the orbital plane of the satellite.

Figure 1:
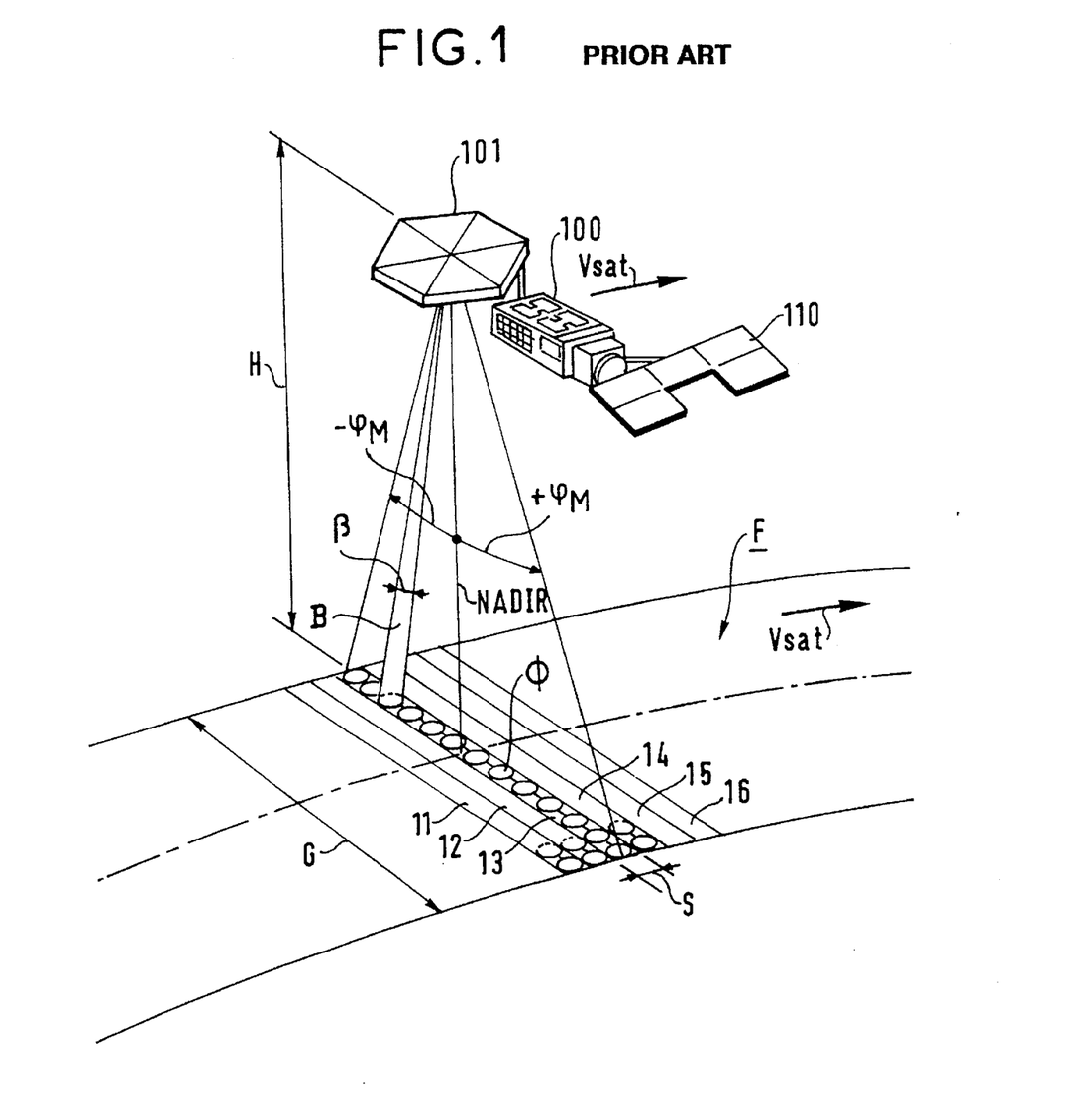
FIG. 1 is described above and is a highly simplified overall diagram of a prior art single beam radar remote detection system using a satellite with an electronically-scanned antenna.

FIG. 1 is a diagram showing a radar remote detection satellite known in the prior art.

In FIG. 1, a satellite 100 overflies the earth at a height H of about 400 km to about 500 km, with a velocity $V_{sat}$ which depends on the geometrical parameters of the orbit. The satellite is fitted with equipment appropriate to its mission, such as a solar panel 110 and a radar antenna 101. In the simplest configuration, as it moves past, the radar remote detection satellite illuminates a swath F on the ground, of width G, and occupying a "transverse" illumination plane that contains the nadir and that is perpendicular to the velocity $V_{sat}$. The swath F is illuminated by successive microwave pulses whose reflections constitute the radar signal that is received by the same antenna 101 operating in reception, and that is interpreted for the purpose of extracting the desired atmospheric data.

To illuminate the swath F, a fine pencil B of radiation is scanned in the transverse plane using the electronic scanning technique in order to illuminate an approximately rectangular strip on the ground of width G and of length S (in the velocity direction $V_{sat}$). The pencil B has angular divergence $\beta$ (thereby giving a diameter $\emptyset$ on the ground), and it is radiated at an angle $\Psi$ that takes a different value on each pulse within a range of values such that the maximum variation $\pm \Psi_M$ is typically of the order of $\pm 10°$ to $\pm 20°$.

Thus, as the satellite moves, successive strips (11, 12, 13, 14, 15, 16, . . . ) are illuminated so as to end up by covering the entire swath F.

By way of example, typical values for the various parameters applicable to remote detection missions already in operation are as follows:

| H (km) | G (km) | S (km) | $\emptyset$ (km) | $\pm \phi_M$ |
|---|---|---|---|---|
| 500 | 100 | 3 | 1.6 | $\pm 5.7°$ |
| 430 | 200 | 3 | 2.8 | $\pm 13°$ |

To improve detection of precipitation rates, it is known that two successive measurements at the same location make it possible to reduce random measurement effects due, for example, to atmospheric disturbances such as gradients or variations in the density or the temperature of the air on the path of the radar wave. It has also been envisaged that two radar measuring equipments could be provided on board a satellite so as to perform two measurements over the same geographical area, with the two measurements being separated by a short period of time. In addition, by looking at the same zone with two different angles of incidence ($+\alpha$, then $-\alpha$) it becomes possible to detect precipitation rates with greater accuracy. Such an installation is known to the person skilled in the art as "stereoradar" by analogy with stereo binocular vision.

This can be obtained using two identical antennas, one aiming slightly in front of the nadir at an angle $+\alpha$ while the other is aimed slightly behind the nadir, at an angle $-\alpha$. A typical value for the angle $\alpha$ lies in the range about $15°$ to about $20°$. Two strips on the ground are thus illuminated by two respective beams $B_F$ and $B_B$, these two beams being separated by a distance $D=2 \times H \times \tan\alpha$, where H is the instantaneous height of the satellite above the ground. Thus, a location illuminated for the first time by the front beam $B_F$ will be illuminated a second time by the back beam $B_B$ after a time interval $t=D/V_{sat}$.

Figure 2:
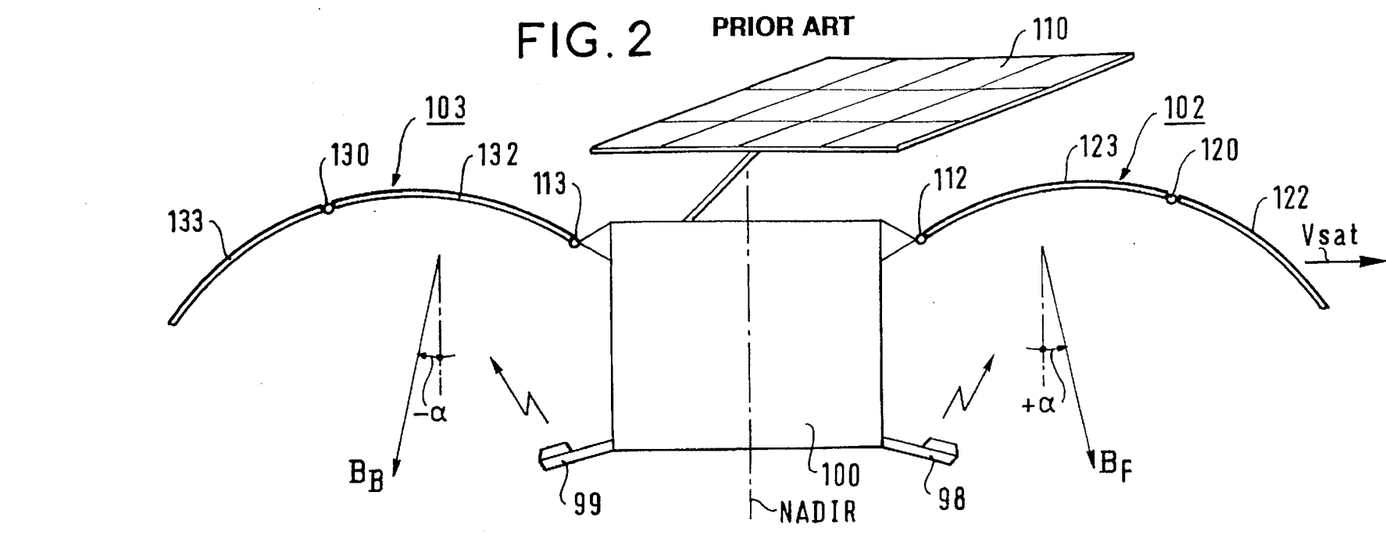
FIG. 2 is described above and is an overall diagram of a prior art stereoradar remote detection satellite system.

A satellite carrying such a payload is known in the prior art and is shown highly diagrammatically in profile in FIG. 2.

As in the preceding FIG., the remote detection satellite 100 includes a solar panel 110 and it moves along a vector $V_{sat}$. The payload of this stereoradar satellite comprises two radar antennas each including a reflector (102, 103) illuminated by an array of sources (98, 99) enabling electronic scanning to be performed in the transverse plane. The relative geometry of the sources and of the reflectors is known for the purpose of transmitting a front beam $B_F$ that slopes at an angle $+\alpha$ relative to the nadir, in the direction of $V_{sat}$, and a back beam $B_B$ that slopes at an angle $-\alpha$ relative to the nadir. The two beams may be emitted either simultaneously or they may be switched on in alternation. Between two transmitted pulses, the equipment operates in reception to receive reflected radar waves in conventional manner.

Several problems arise with the conventional installation of a stereoradar satellite as described above. Firstly a remote detection satellite may have other missions and other on-board equipment, thereby giving rise to problems of space availability on board the satellite: to perform a stereoradar mission in its conventional configuration, it is necessary for both the front face and the rear face of the satellite to be available to carry the reflectors (102, 103). Unfortunately, that is not always the case.

In addition, successive superposition of the "footprints" of the two beams depends on the accuracy with which the two reflectors are positioned and pointed, and also on their relative positioning and pointing. Unfortunately, the accuracy of such positioning is compromised by the complexity of the antennas, in particular by the mechanisms used for deploying them.

Figure 3:
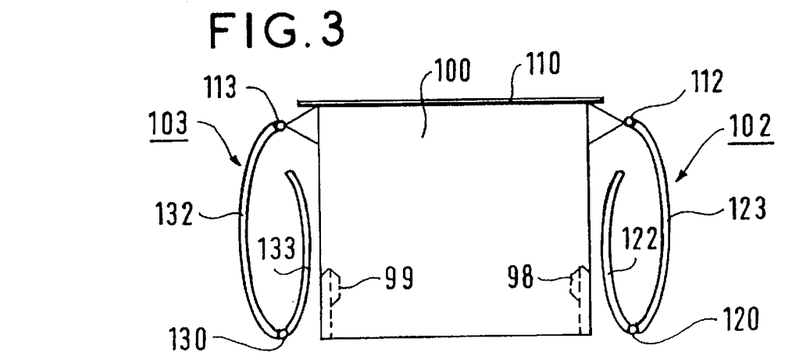
FIG. 3 is described above and is an overall view of the FIG. 2 satellite in its launch configuration.

FIG. 3 is a diagram showing the same stereoradar remote detection satellite as FIG. 2, but in its launch configuration. It can be seen that for launching, the reflectors 102, 103 must be folded up so as to make it possible for them to be inserted together with the body 100 of the satellite inside the nosecone of the Ariane launcher or inside the hold of the American shuttle, for example. In the simplest case, both reflectors 102 and 103 are hinged to the body 100 of the satellite at hinges 112, 113, and each reflector (102, 103) is made up of a plurality of segments (122, 123; 132, 133) which are likewise hinged about respective hinges (120, 130).

The deploying of such structures in orbit is not without risk, and numerous satellites are handicapped in their missions because of ineffective deployment of vital members such as solar panels, antennas, etc. However, even when deployment is successful, the relative positions of the various hinged portions relative to one another can neither be foreseen, nor estimated, nor controlled with great accuracy, and the greater the number of hinged components, the lower the accuracy possible. Furthermore, the relative positions of those elements can vary over time, e.g. because of differential thermal expansion due to solar heating as the satellite moves.

Finally, such a conventional stereoradar configuration has mass and bulk that are double those of the single beam equipment shown in FIG. 1.

OBJECTS AND SUMMARY OF THE INVENTION

An object of the invention is to remedy those drawbacks of the prior art, and to this end the invention provides an electronically-scanned two-beam ($B_F$, $B_B$) antenna for stereoradar that includes only one reflector structure. According to a preferred characteristic, the electronic scanning is in a transverse plane, the two beams ($B_F$, $B_B$) are fine (angular divergence $\beta$ of the order of 0.18° to 0.4°, giving a ground diameter $\emptyset$), and the scanning range in a transverse plane together with the separation ($2\alpha$) in a "longitudinal" orthogonal plane are of the order of 50 times to 200 times the angular divergence ($\beta$) of each beam.

According to an important characteristic of the invention, this reflector structure comprises two reflector shells, at least one of which is a grid reflector, said two reflectors being mutually disposed to form a grid double reflector. According to a preferred characteristic, the two shells are connected together by structural elements constituted by spacer-stiffeners. According to another preferred characteristic, the two reflectors are cylindro-parabolic in shape. In a preferred embodiment, the section of each cylindro-parabolic reflector in a plane transverse to its rectilinear generator lines is a portion of a parabola, and the two portions of parabola are "inverted", i.e. the vertex of each parabola is at one of the ends of the portion of parabola, with the vertex of the parabola of the first reflector being at a first end of the structure, while the vertex of the parabola of the second reflector is at a second end of the grid double reflector structure.

According to an important characteristic, a first grid reflector reflects a first polarization while allowing a second polarization orthogonal to the first polarization to pass through it with substantially no absorption or reflection. In a preferred embodiment, the reflectors are illuminated by a plurality of linear arrays of radiating sources whose transmission phases can be controlled in such a manner as to perform electronic scanning in a "transverse" plane. In a variant, the arrays of sources are in an offset disposition relative to the respective reflectors, i.e. they lie outside the field of radiation reflected by the reflectors.

According to a characteristic, the antenna operates as a pulse radar, alternating between transmission and reception. In a variant, the antenna of the invention operates as a radiometer, i.e. in reception only.

The two-beam antenna of the invention is of lower mass and bulk than the above-described conventional solution. It is much simpler to install on a multi-mission satellite and to deploy once in orbit. Finally, the accuracy of the relative positioning between the two reflectors is significantly improved, thereby giving greater accuracy and better reliability to the measurements performed by the equipment.

BRIEF DESCRIPTION OF THE DRAWINGS

In any event, the invention will be well understood, and its advantages and characteristics will appear more clearly from the following description of various non-limiting embodiments, described with reference to the accompanying diagrammatic drawings, in which.

MORE DETAILED DESCRIPTION

In the various FIGS., the same references are used to refer to the same elements. The scale of the drawings is not always entirely accurate for reasons of clarity. The examples shown relate to antennas on board earth observation satellites. However, it will be understood that the invention also relates to antennas of the same kind but for other moving platforms, such as aircraft or other space vehicles, such as planetary or inter-planetary probes.

All of the examples that are discussed in detail for explanatory purposes make use of a transmission antenna. However, the person skilled in the art is well aware of the reciprocity theorem whereby an antenna operates identically in transmission and in reception, providing the time vector is reversed.

Thus, the description and comments made below concerning transmission antennas is strictly transposable to reception antennas, providing the direction of power flow through the apparatus is reversed.

For a radar antenna, the same physical device is generally called upon to perform both the transmission function and the reception function. However, two amplifier systems must be provided, one to provide the power amplification required for transmitting microwaves, and the other to perform low noise amplification of the relatively weak radar signals that are received after the wave has been reflected by the radar target. The processing performed by the two paths, i.e. the reception path and the transmission path, is entirely symmetrical apart from the above detail, and to clarify the description below, only the transmission path is described, it being understood that inverting the description to apply to a reception path can be performed without ambiguity by a person skilled in the art.

In the context of a radiometry mission, it is necessary to provide only a reception antenna and the corresponding low noise amplification system. The structure of the antenna itself remains identical to that of a radar antenna except insofar as there is no need to provide microwave power amplification electronics for powering microwave transmission.

Figure 4:
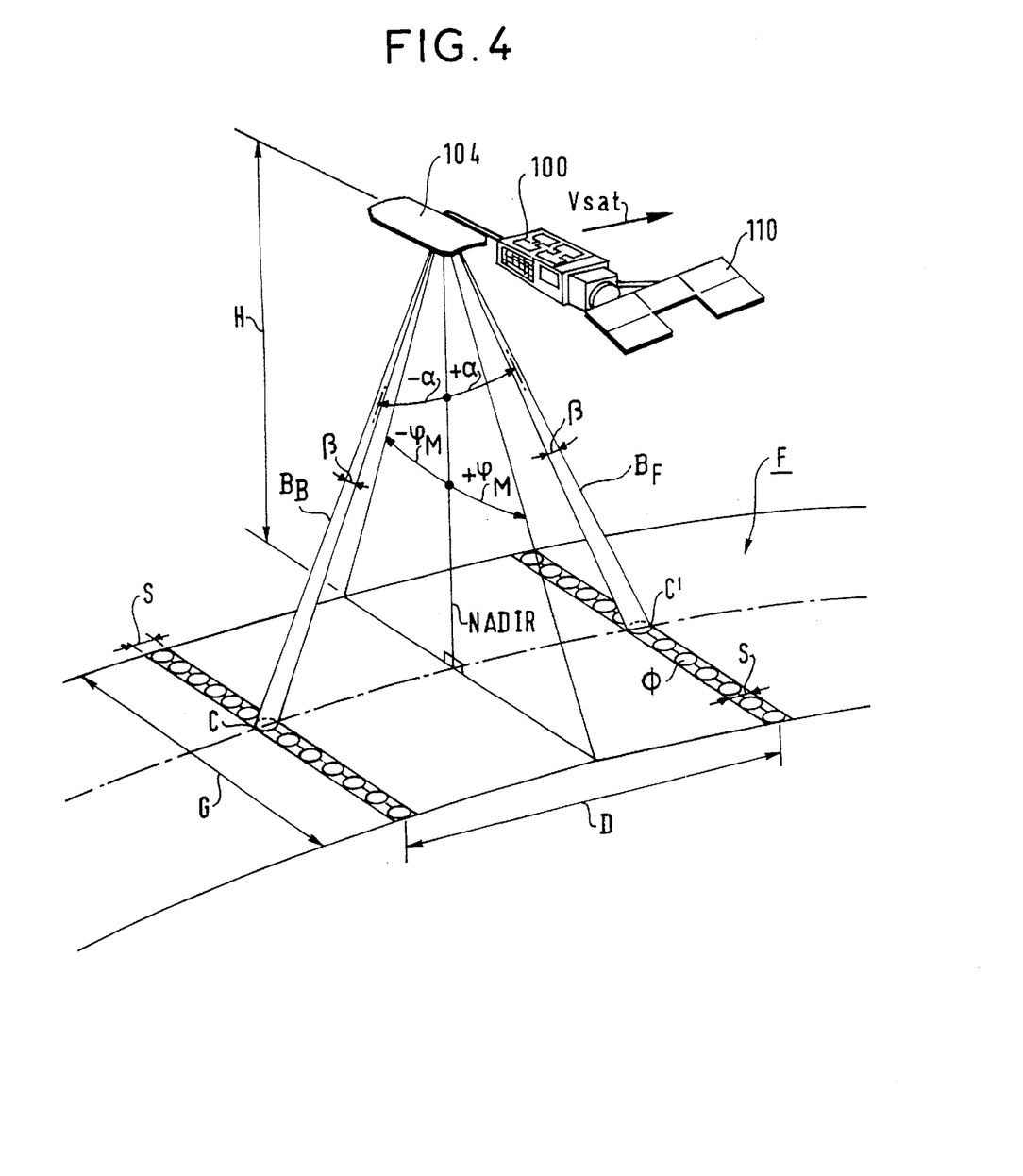
FIG. 4 is a diagrammatic view of a stereoradar remote detection satellite system having an electronically-scanned two-beam antenna of the invention.

FIG. 4 is a diagrammatic view of a stereoradar remote detection satellite system using an electronically-scanned two-beam antenna of the invention. As in FIG. 1, a remote detection satellite 100 overflies the earth at a height H in a direction and at velocity $V_{sat}$ that depend on the geometrical parameters of the orbit. The satellite is provided with the equipment required for performing its mission, such as a solar panel 110 and the radar antenna 104. In its stereoradar configuration, a radar remote detection satellite illuminates, either simultaneously or in switched alternation, two strips of the ground (C, C') each of width G (width in a direction perpendicular to the velocity $V_{sat}$). The swath F on the ground is thus illuminated on two successive occasions each time the satellite goes past, a first occasion by the front beam $B_F$, and a second occasion by the back beam $B_B$.

As in the prior art, the swath F is illuminated by successive microwave pulses whose reflections constitute the radar signal that is received by the same antenna 104 operating in reception, and that is interpreted in order to extract the desired atmospheric data.

To illuminate the swath F, the stereoradar thus makes use of two narrow pencils ($B_F$, $B_B$) of radiation having small angular divergence $\beta$, each pencil being scanned in a respective transverse plane that is inclined at an angle $\pm \alpha$ relative to the transverse plane containing the nadir, thereby illuminating two approximately rectangular strips of the ground, each of width G and of length S (length in the velocity direction $V_{sat}$). The orientation of a pencil ($B_F$, $B_B$) giving a ground diameter $\emptyset$ (approximately), can be specified by two angles: $\pm \alpha$ relative to the nadir in a "longitudinal" plane containing the nadir and the vector $V_{sat}$; and an angle $\Psi$ between the beam and the longitudinal plane. The value of the angle $\alpha$ is of the order of 15° to 20°, and it is set when the satellite is designed, whereas the angle $\Psi$ takes a different value on each pulse within a range of values having maximum variation $\pm \Psi_M$ that is typically of the order of ±10° to ±20°. The angular divergence of beams is typically of the order of 0.18° to 0.4° (−3 dB width), as in the prior art. As a result, in a preferred embodiment of the invention, the scan range ($\pm \Psi_M$) of each beam in a transverse plane, and the separation (2$\alpha$) between the two beams in a "longitudinal" orthogonal plane are of the order of 50 times to 200 times the angular divergence ($\beta$) of each beam.

Figure 5:
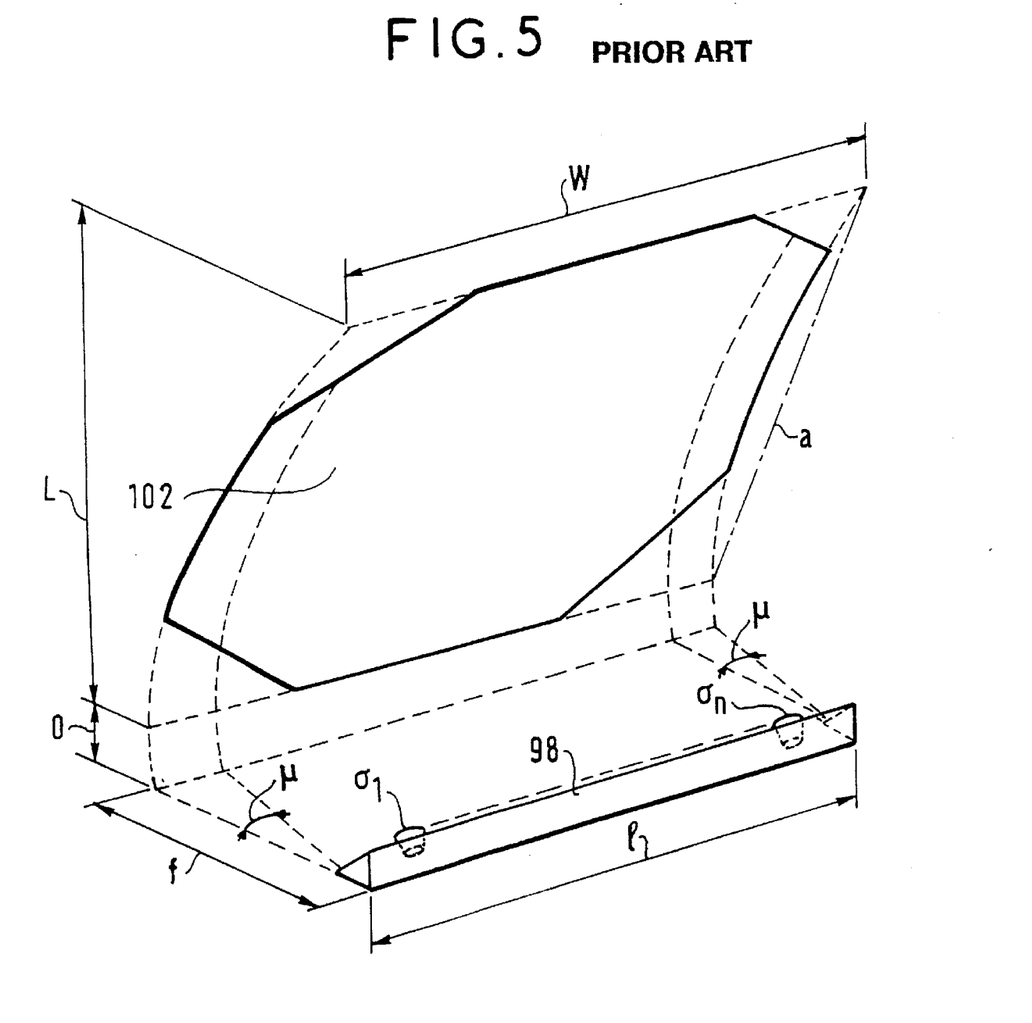
FIG. 5 is a diagrammatic perspective view of a prior art offset single beam antenna having a cylindro-parabolic reflector and that is electronically scanned, as used in a system as shown in any one of FIGS. 1 to 3.

FIG. 5 is a diagrammatic perspective view of a prior art offset single beam antenna having electronic scanning and a cylindro-parabolic reflector, suitable for use as one of the radar antennas shown in FIGS. 2 and 3. The rectilinear generator lines of the cylindro-parabolic reflector 102 extend perpendicular to the vector $V_{sat}$, and parallel to the transverse electronic scanning plane. The cross-section of the reflector is a parabolic arc having a chord a subtended by the arc and constituting the hypotenuse of a right-angle triangle whose other two sides are of length L (in the direction of $V_{sat}$) and f at right-angles thereto. The width of the reflector (in the electronic scanning direction) is W.

The dimensions L and f of the reflector are selected as a function of the gain required of the antenna, and also as a function of beam parameters such as its very fine angular divergence $\beta$. The dimension W is selected as a function of the length l of a linear array 98 of radiating sources ($\sigma_1, \sigma_2, \ldots, \sigma_n$) and the maximum angle $\mu$ of the electronic scanning in the transverse plane ($\pm \mu$ on either side of a plane containing the nadir and $V_{sat}$). Electronic scanning is obtained in conventional manner by acting on the phases of the sources ($\sigma_1, \sigma_2, \ldots \sigma_n$).

To obtain the desired low divergence $\beta$, the linear array 98 must be disposed substantially along the focal line of the cylindro-parabolic reflector. Also, to prevent the array 98 of sources lying on the path of the beam reflected by the reflector 102, the array 98 is disposed at a small offset relative to the reflector, being offset by a distance O.

Typical dimensions corresponding to the satellite mission shown in FIGS. 2 and 3 are as follows:

| L (m) | O (m) | f (m) | μ(°) | l (m) | W (m) | a (m) |
| --- | --- | --- | --- | --- | --- | --- |
| 4.78 | 0.2 | 2.39 | ±15° | 4.78 | 6.06 | 5.39 |

Figure 6:
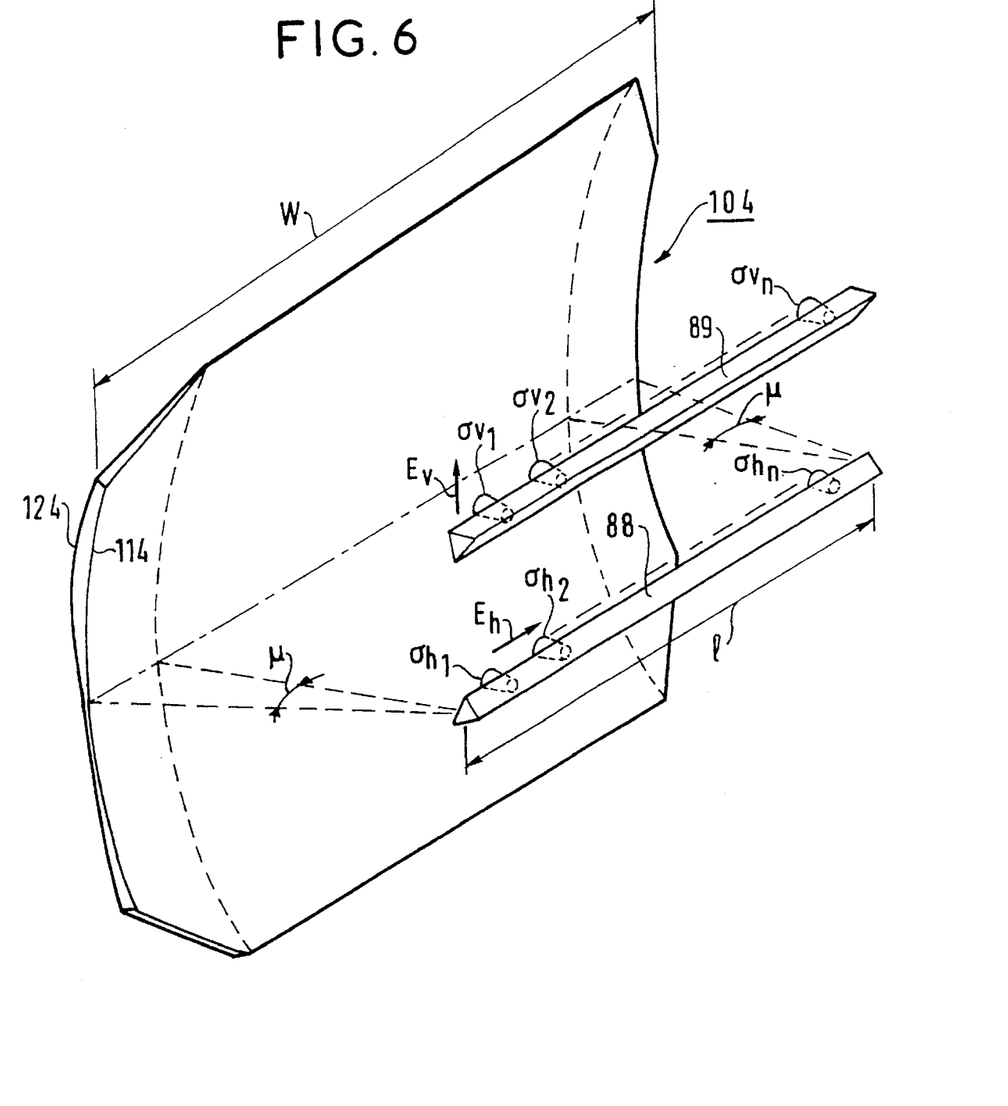
FIG. 6 is a diagrammatic perspective view of a cylindro-parabolic two-reflector antenna of the invention with electronic scanning and as used in a FIG. 4 system.

FIG. 6 is a diagrammatic perspective view of a cylindro-parabolic two-reflector antenna of the invention with electronic scanning, as used in a system as shown in FIG. 4. The geometry of this antenna is derived from that of the FIG. 5 antenna by doubling up the component parts thereof. Thus, there can be seen two linear arrays (88, 89) of individual radiating sources, and two cylindro-parabolic reflectors (114, 124). This device is designed to radiate two narrow beams that are spaced apart by $\pm \alpha$ about the nadir.

Figure 7:
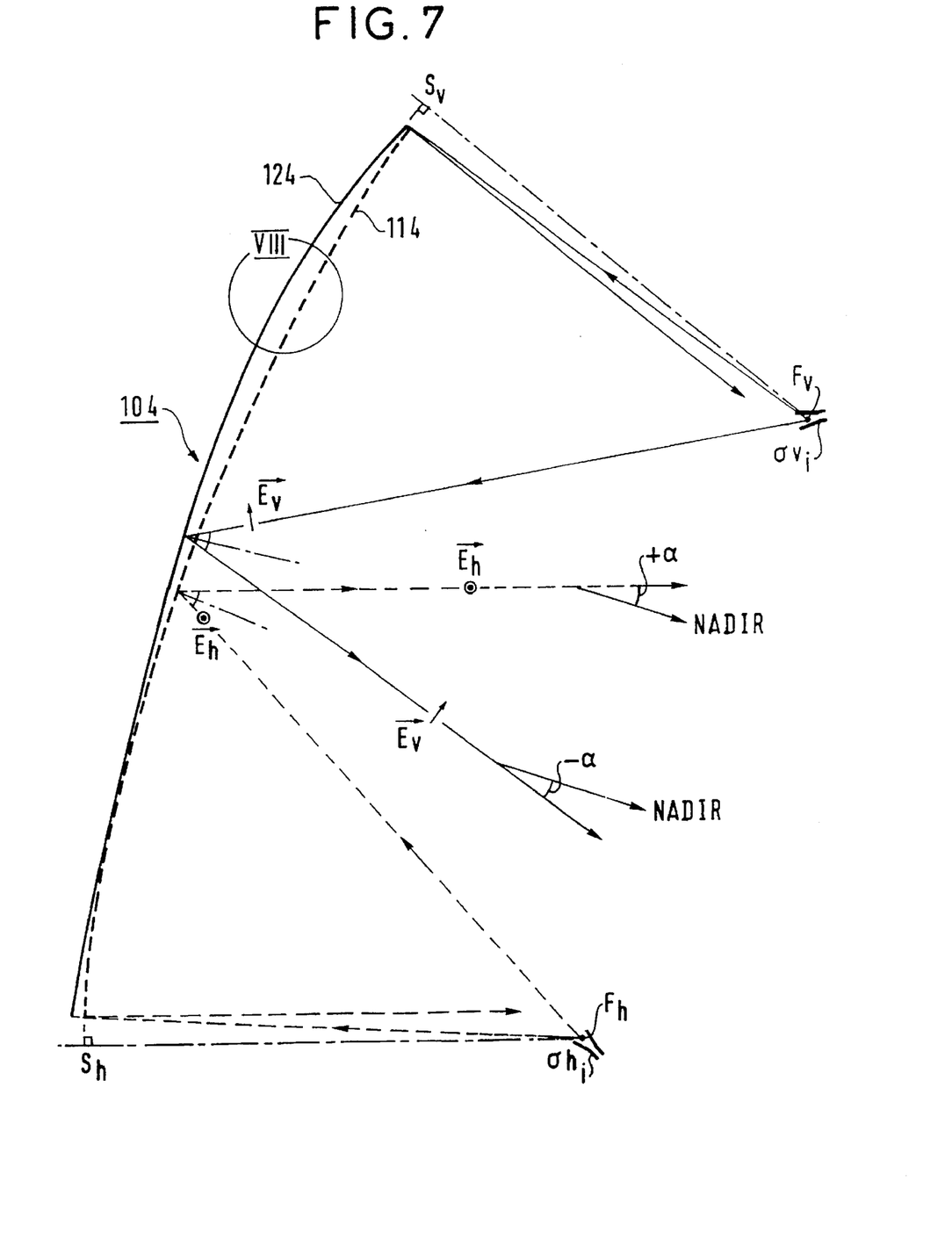
FIG. 7 is a diagrammatic section view through the antenna of FIG. 6.

Its dimensions are similar to those of the FIG. 5 antenna, and to clarify FIG. 6, they are not all marked thereon. For example, it can be seen that the complex reflector 104 has the same width W, for linear arrays 88, 89 of the same length l and for the same maximum angle $\mu$ of electronic scanning in the transverse plane ($\pm \mu$ on either side of the plane containing the nadir and $V_{sat}$). The offset geometry is modified compared with FIG. 5, however that can be seen more clearly in the following FIG. (FIG. 7).

For proper operation of the two-beam antenna of FIG. 6, each beam must be radiated and reflected independently of the other. To do this, the antenna of the invention makes use of orthogonal polarizations for the two beams. For example, a first linear array 89 is made up of a plurality of elementary sources ($\sigma_{v1}, \sigma_{v2}, \ldots \sigma_{vn}$) which transmit radiation $E_v$ having vertical polarization; whereas the second linear array 88 is made up of a plurality of elementary sources ($\sigma_{h1}, \sigma_{h2}, \ldots, \sigma_{hn}$) which transmit radiation $E_h$ having horizontal polarization (i.e. parallel to the rectilinear generator lines of the reflector 104). Naturally, it is possible to choose orthogonal polarizations other than those chosen for this example.

Each linear array must be associated in an accurate geometrical disposition with respect to its own reflector.

Thus, the horizontally polarized radiation $E_h$ is reflected by the horizontal polarization reflector 114, while the vertically polarized radiation $E_v$ is reflected by the vertical polarization reflector 124.

In this example, because the horizontal polarization reflector 114 is in front of the vertical polarization reflector 124, the reflector 114 must be transparent to vertically polarized radiation $E_v$. This can be achieved by using a grid reflector for the front reflector 114, having the structure and properties that are well known to the person skilled in the art: a grid of parallel wires reflects polarization that is parallel thereto while allowing orthogonal polarization to pass therethrough, which polarization is then reflected by the back reflector 124.

The grid reflector 114 may be implemented using techniques known to the person skilled in the art by etching parallel conductive tracks on a dielectric support or "shell" having the desired cylindro-parabolic shape. The dielectric is selected as a function of its mechanical and electrical properties, in particular its transparency to microwave electromagnetic radiation. Grid double reflector antennas are known in other applications, and the various techniques for manufacturing them are also known.

Since the reflector 124 lies behind the grid reflector 114 which is polarization selective, it receives only the vertical polarization $E_v$, i.e. only the polarization that is capable of passing through the horizontal grid of the reflector 114. The back reflector 124 therefore does not need to be polarization selective. It is easier to implement: all that is required is a conductive layer having the desired shape. To obtain the required cylindro-parabolic shape, while minimizing its weight, the back reflector may also be implemented by depositing a metal layer on a dielectric support or shell having the desired shape.

Given the dimensions of the antenna, which are similar to those given in the table above, and given the problems of dimensional stability mentioned in the introduction, it is desirable for the structure of the complex reflector 104 to be as rigid as possible, so as to retain the geometrical relationships intended by the designer of the antenna. In an advantageous embodiment of the invention, the space between the two dielectric shells 114 and 124 is used for reinforcing the rigidity of the assembly.

This can be done by means of spacer-stiffeners (shown in FIG. 8) which are shaped wedges that can be inserted and fixed between the two shells by means of a suitable adhesive or by any other fixing means. In another variant embodiment, the space between the two shells may be filled in part or in full by a honeycomb whose thickness is worked to match the two shells over the entire surface thereof, thereby forming a sandwich in which the honeycomb lies between the two dielectric shells. This kind of structure is conventional for obtaining structural elements having a large stiffness/weight ratio.

The elementary sources ($\sigma_{v1}$, $\sigma_{v2}$, . . . ,$\sigma_{vn}$; $\sigma_{h1}$, $\sigma_{h2}$, . . . , $\sigma_{hn}$) are sources of the kind commonly used in arrays, such as horns or etched microstrip elements, with or without resonators. The designer of the antenna will choose which particular kind of elementary source to use from the various kinds of source available.

FIG. 7 is a diagrammatic section view on the longitudinal plane (containing the nadir and the vector $V_{sat}$) of the antenna of FIG. 6, i.e. a cylindro-parabolic two-reflector antenna of the invention with electronic scanning. This FIG. clearly shows the geometrical dispositions of the various elements marked on the preceding FIG. The section passes through a pair of sources ($\sigma_{vi}$, $\sigma_{hi}$) located respectively at the focuses ($F_v$, $F_h$) of the corresponding cylindro-parabolic reflectors (124 for vertical polarization; 114 for horizontal polarization).

The offset geometry of each source/reflector pair can be seen from this FIG. Using this advantageous geometry, the longitudinal section of each of the two reflectors 124, 114 is a length of a parabola, with the vertices of the parabolas ($S_v$, $S_h$) each lying a little way from the corresponding lengths. The parabolas are disposed in an "inverted" configuration, i.e. the vertex of each parabola is at a respective end of the lengths of parabola, i.e. the vertex $S_h$ of the parabola of the first reflector 114 is at a first end of the structure 104 (at the bottom of the FIG.), while the vertex $S_v$ of the parabola of the second reflector 124 is at a second end of the structure of the grid double reflector (at the top of the FIG.). Because the vertices of the parabolas lie outside the reflecting portions of each of the reflectors, the sources ($\sigma_{vi}$, $\sigma_{hi}$) lie outside their respective beams after reflection, as shown in the FIG. at the ends of each reflector.

The radiation emitted by each source ($\sigma_{vi}$, $\sigma_{hi}$) is divergent, but since each source lies at the focus of its corresponding reflector, the radiation forms a beam of substantially parallel rays after reflection, thereby making it possible to obtain the small divergence $\beta$ required of the beam of a remote detection mission using radar from space, as described in the introduction.

The FIG. shows that with the inverted disposition of the parabolic lengths, the angle $2\alpha$ between the two beams is easily obtained between the two focal axes each of which is at a slope of $+\alpha$ or $-\alpha$ relative to the nadir, for the horizontally polarized beam $E_h$ and for the vertically polarized beam $E_v$, respectively.

The longitudinal section of FIG. 7 is perpendicular to the rectilinear generator lines of the cylindro-parabolic reflectors of the invention. Thus, the reflectors can be made by moving said section in translation along said rectilinear generator lines so as to obtain the cylindro-parabolic two-reflector antenna of the invention.

The structure described as the embodiment of FIGS. 4, 6, and 7 display the following performance advantages of the invention. The beams can be scanned in the transverse direction through the desired angle $\Psi$ by controlling the linear phase relationship over the linear arrays 88, 89. In a longitudinal plane, the beams are formed with small divergence $\beta$ as though reflected on a mirror by the rectilinear generator lines of one or other of the shells (114, 124), thereby ensuring constant quality over the entire width G of the swath F, providing the reflector is longer than the array so as to be capable of intercepting its radiation when propagating off boresight, as shown in FIGS. 5 and 6.

Figure 8:
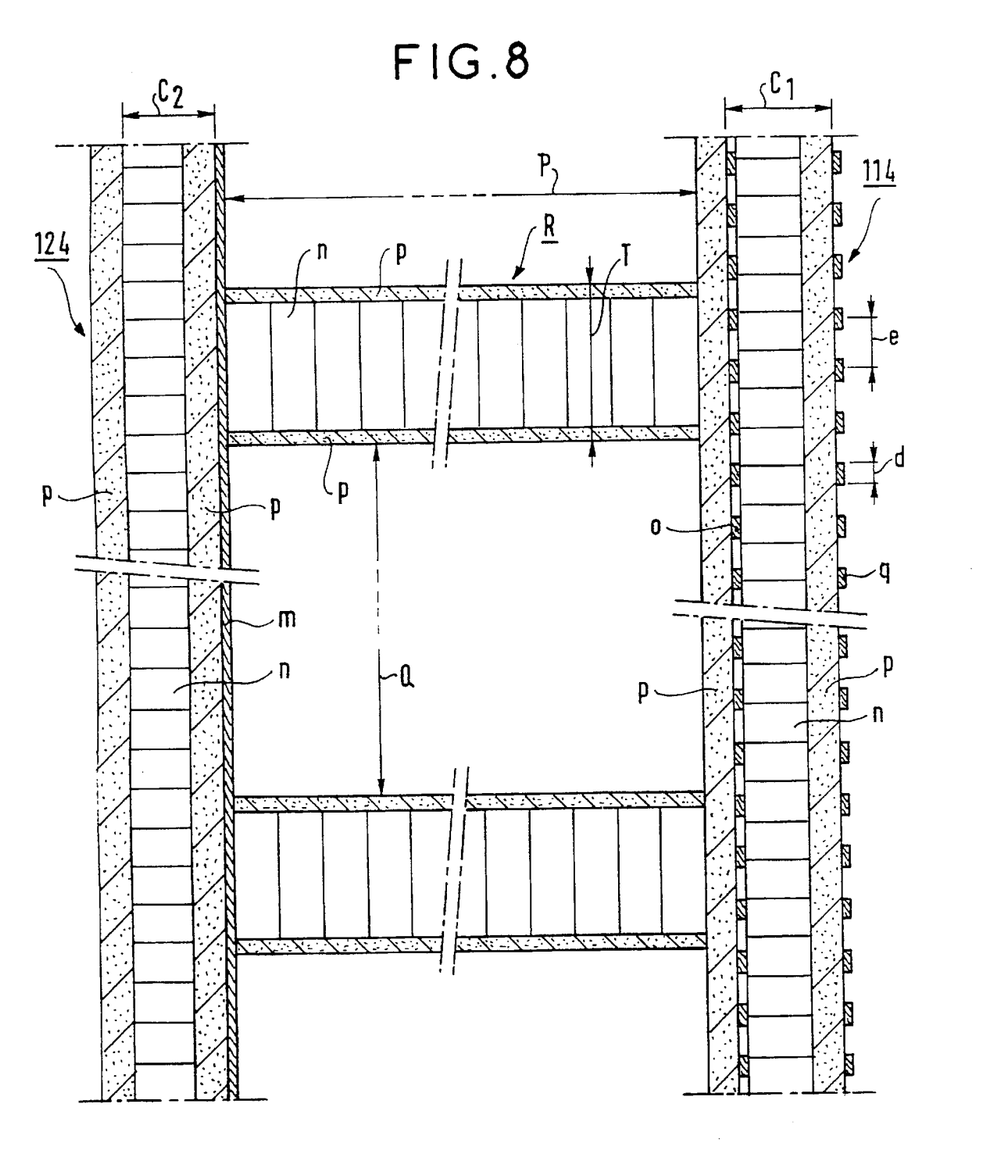
FIG. 8 shows a detail of FIG. 7 on a larger scale.

FIG. 8 is on a larger scale and shows a detail of a small portion of FIG. 7 in a preferred embodiment of the antenna of the invention.

Advantageously, the two reflector shells (114, 124) are similar in structure and size. For example, each reflector shell may be made of two skins (p) of dielectric material, e.g. made of KEVLAR™, which are glued to a thickness ($C_1$, $C_2$) of honeycomb (n) which may be made of the same substance.

Decoupling between the two beams is achieved by orthogonal linear polarizations, e.g. horizontal polarization and vertical polarization. Parallel wires (q) are etched on the front shell 114 and serve to reflect only the polarization which is parallel thereto (horizontal in FIG. 7). The orthogonal polarization (vertical in the FIG.) passes through this grid and is reflected on the back shell 124 which is conductive and does not have wires (or could optionally have vertical wires, although that is not essential). This ensures that the radiation received from each of the two linear arrays 89, 88 is reflected by one of the shells only, and in particular by the shell having the array situated on its focal line.

The spacing (e) and the width (d) of the wires (q) are optimized to improve the reflecting properties at the operating frequency of the antenna, using rules known to the person skilled in the art. The wires are advantageously etched on a dielectric skin (p) which is very thin. The skin necessarily gives rise to interface effects due to the difference in dielectric constant between vacuum and the skin. This mismatch can be minimized by etching two identical wire grids (q, o) on each of two skins (p) of the front shell 114, which two skins are spaced apart by a distance $C_1$ which is advantageously one-fourth of the wavelength at the operating frequency of the antenna. In application of conventional microwave theory, the reflections caused by the two discontinuities in dielectric constant on either side of the shell 114 which is one-fourth of a wavelength thick are superposed in phase opposition and therefore cancel.

The two reflector shells (114, 124) are spaced apart by a distance (P) that lies in the range 0 to about 10 cm, since the two generating parabolas are inverted in the structure 104. The structure is stiffened by means of spacer/stiffeners (R) of structure similar to that of the two shells of the reflector (two dielectric skins (p) stuck on a honeycomb n, thereby giving a total thickness T of the order of one or two centimeters). Such spacer/stiffeners R may be placed as reinforcing beams between the two shells (114, 124) and they may be spaced apart by a dimension Q of about 20 cm, for example.

Overall, the above-described reflector has the same outside dimensions as an equivalent single beam antenna, while nevertheless allowing two beams to be implemented that are separated by a large angle $2\alpha$. Its mass is less than that of two prior art single-beam reflectors as shown in FIGS. 2 and 3, and its dimensional stability makes it possible to perform a mission with greater accuracy than can be achieved with prior art antennas.

I claim:

1. A stereoscopic satellite-based radar system having an electronically-scanned antenna supported on a non-geostationary satellite, the improvement wherein said antenna comprises:

a first source for emitting a first polarized beam;

a second source for emitting a second beam polarized orthogonally to said first polarized beam;

a first reflector for reflecting said first beam to a first region of the surface of the earth and for passing said second beam without substantial reflection; and a second reflector for reflecting said second beam to a second region of the surface of the earth.

2. A two-beam antenna according to claim 1, wherein said first reflector is a grid reflector, and said first and second reflectors are mutually disposed to form a double grid reflector structure.

3. A two-beam antenna according to claim 2, wherein said first and second reflectors are connected together by structural elements constituting spacer-stiffeners.

4. A two-beam antenna according to claim 2, wherein said first and said second reflectors are cylindro-parabolic in shape.

5. A two-beam antenna according to claim 2, wherein said grid reflector comprises a dielectric support of desired shape and having two faces, with two dielectric skins being stuck thereon, and wherein at least one of the two skins is etched with parallel conducting tracks to form said grid.

6. A two-beam antenna according to claim 5, wherein said dielectric support has a thickness of one-fourth of a wavelength at the operating frequency of the antenna, and wherein parallel conductive tracks are etched on said two dielectric skins.

7. A two-beam antenna according to claim 1, wherein said first reflector comprises a grid for reflecting said first polarized beam while allowing said second polarized beam to pass therethrough substantially without being absorbed or reflected.

8. A two-beam antenna according to claim 1, wherein said first and second sources comprise linear arrays of radiating sources whose transmission phases can be controlled so as to perform electronic scanning in one or more transverse planes located orthogonal to a direction of movement of said satellite system.

9. A two-beam antenna according to claim 8, wherein said source arrays are disposed so as to be offset relative to their respective reflectors, lying outside the reflected field radiated by each of said reflectors.

10. A two-beam antenna according to claim 1, wherein said antenna further comprises phase shifting and amplification means enabling the antenna to alternately transmit and receive pulse radar.

11. A two-beam antenna according to claim 10, wherein said first and second sources emit successive microwave pulses.

12. A two-beam antenna according to claim 1, wherein said antenna further comprises phase shifting and amplification means enabling the antenna to operate as a radiometer wherein it receives but does not transmit signals.

13. A device according to claim 1, wherein said satellite system is a low orbit satellite.

14. A two-beam antenna according to claim 1, wherein said first reflector emits said first reflected beam in front of said satellite and said second reflector emits said second reflected beam behind said satellite in the direction of motion of said satellite with respect to the surface of the earth.

15. A two-beam antenna according to claim 14, wherein said first and second reflected beams consist of successive microwave pulses.

16. A two-beam antenna according to claim 1, wherein said first reflector emits said first reflected beam in front of the nadir at an angle $+\alpha$ relative to the nadir, and wherein said second reflector emits said second reflected beam behind the nadir at an angle $-\alpha$ relative to the nadir.

17. A two-beam antenna according to claim 16, wherein $\alpha$ is in the range of 15 to 20 degrees.

18. A device according to claim 1, wherein each beam scans respective transverse planes inclined at equal and opposite angles relative to a first transverse plane, said first transverse plane containing a nadir and located orthogonal to a direction of movement of said satellite, such that said beams illuminate two approximately rectangular strips of ground, wherein a separation of said first and second beams in a longitudinal plane containing the nadir and located orthogonal to said transverse planes is 50 to 100 times the angular divergence of each respective beam.

19. An electronically-scanned two-beam antenna for stereoscopic radar, the antenna comprising a single reflector structure, wherein each beam has its own polarization, the two polarizations being mutually orthogonal, wherein said reflector structure comprises two reflector shells having a cylindro-parabolic shape, at least one of which is a grid reflector, said two reflectors being mutually disposed so as to form a grid double reflector, wherein a cross-section of both of said cylindro-parabolic reflector shells in a plane transverse to a plurality of rectilinear generator lines implanted thereon constitutes a portion of a parabola, and wherein said parabola portions are mutually disposed in an inverse manner such that the vertex $S_h$ of the parabola of the first reflector is disposed at a first end of the structure while the vertex $S_v$ of the parabola of the second reflector is disposed at the second end of the structure of the grid double reflector.

20. A stereoscopic satellite-based radar system having an electronically-scanned antenna supported on a non-geostationary satellite, the improvement wherein said antenna comprises:

a first source for emitting a first polarized beam;

a second source for emitting a second beam polarized orthogonally to said first polarized beam; and a single reflector structure for reflecting the first and second beams in accordance with their polarization;

said antenna electronically scanning the reflected beams over respective scanning ranges in respective transverse planes separated from one another by a separation angle, each beam having a divergence angle, and wherein the scanning ranges and separation angle are 50 to 200 times the divergence angle of each beam, a first reflector for reflecting said first beam to a first region of the surface of the earth and for passing said second beam without substantial reflection; and a second reflector for reflecting said second beam to a second region of the surface of the earth.

21. A stereoscopic satellite-based radar system having an electronically-scanned antenna supported on a non-geostationary satellite, the improvement wherein said antenna comprises:

a first source for emitting a first polarized beam;

a second source for emitting a second beam polarized orthogonally to said first polarized beam; and a single reflector structure for reflecting the first and second beams in accordance with their polarization.

* * * * *